United States Patent [19]

Seligmann et al.

[11] Patent Number: 5,469,442

[45] Date of Patent: Nov. 21, 1995

[54] COMPACT SELF-CONTAINED ELECTRICAL-TO-OPTICAL CONVERTER/TRANSMITTER

[75] Inventors: Daniel A. Seligmann, Manteca; William C. Moss, San Mateo; Theodore C. Valk, Livermore; Alan D. Conder, Tracy, all of Calif.

[73] Assignee: The United States of America as represented by the United States Department of Energy, Washington, D.C.

[21] Appl. No.: 283,473

[22] Filed: Jul. 18, 1994

Related U.S. Application Data

[63] Continuation of Ser. No. 933,642, Aug. 24, 1992, abandoned.

[51] Int. Cl.[6] ............................................. H04J 3/12
[52] U.S. Cl. ................................. 370/110.4; 340/870.04; 340/870.28
[58] Field of Search ................................. 359/142, 144, 359/110; 340/870.04, 870.28, 870.29, 870.39, 693; 370/110.1, 110.4

[56] References Cited

U.S. PATENT DOCUMENTS

| | | | |
|---|---|---|---|
| 4,281,253 | 7/1981 | Culver | 250/551 |
| 4,468,765 | 8/1984 | Hensel et al. | 370/1 |
| 4,481,676 | 11/1984 | Eumurian et al. | 455/608 |
| 4,547,774 | 10/1985 | Gould | 340/854 |
| 4,644,587 | 2/1987 | Takahashi et al. | 455/601 |
| 4,723,122 | 2/1988 | Maltby et al. | 340/870.04 |
| 4,817,202 | 3/1989 | Meyer et al. | 359/110 |
| 4,849,754 | 7/1989 | Maltby et al. | 340/870.04 |
| 4,866,436 | 9/1989 | Kordts et al. | 340/870.28 |
| 4,875,215 | 10/1989 | Hughes | 372/6 |
| 4,905,309 | 2/1990 | Maisonneuve et al. | 359/144 |
| 4,911,519 | 3/1990 | Burton et al. | 350/96.20 |
| 4,916,689 | 4/1990 | Bielinski | 370/4 |
| 4,939,482 | 7/1990 | Nergaard et al. | 359/142 |
| 5,040,331 | 8/1991 | Merendino et al. | 49/25 |
| 5,051,743 | 9/1991 | Orszulak | 340/870.04 |

FOREIGN PATENT DOCUMENTS

| | | | |
|---|---|---|---|
| 8801085 | 2/1988 | WIPO | 359/144 |

OTHER PUBLICATIONS

Graf, R., Modern Dictionary of Electronics, 1977, p. 456.

Primary Examiner—Douglas W. Olms
Assistant Examiner—Chau T. Nguyen
Attorney, Agent, or Firm—Miguel A. Valdes; William C. Daubenspeck; William R. Moser

[57] ABSTRACT

A first optical receiver and a second optical receiver are provided for receiving a calibrate command and a power switching signal, respectively, from a remote processor. A third receiver is provided for receiving an analog electrical signal from a transducer. A calibrator generates a reference signal in response to the calibrate command. A combiner mixes the electrical signal with the reference signal to form a calibrated signal. A converter converts the calibrated signal to an optical signal. A transmitter transmits the optical signal to the remote processor. A primary battery supplies power to the calibrator, the combiner, the converter, and the transmitter. An optically-activated switch supplies power to the calibrator, the combiner, the converter, and the transmitter in response to the power switching signal. An auxiliary battery supplies power continuously to the switch.

5 Claims, 11 Drawing Sheets

COMPACT SELF-CONTAINED ELECTRICAL-TO-OPTICAL CONVERTER/TRANSMITTER

The United States Government has rights in this invention pursuant to Contract No. W-7405-ENG-48 between the United States Department of Energy and the University of California for the operation of Lawrence Livermore National Laboratory. This is a Continuation of application Ser. No. 07/933,642 filed Aug. 24, 1992, now abandoned.

BACKGROUND

The present invention relates to electrical-to-optical converters, and more particularly to a self-contained, self-calibrating circuit apparatus for converting an electrical signal to an optical signal and for transmitting the optical signal through an optic fiber.

Circuits to convert analog electrical signals to analog optical signals are generally known. For example, U.S. Pat. No. 4,281,253 discloses a bidirectional optical fiber assembly that uses a dual function diode which functions both as a light emitter and as a detector of optical signals. U.S. Pat. No. 4,468,765 discloses optical fiber links for use in electronic telephone exchanges and employs an optical transmitter which consists of an LED coupled into an optical fiber. U.S. Pat. No. 4,481,676 is for a transmitter-receiver system for variable-rate digital data transmission via optical-fiber links which eliminates the effect of overoscillations and extends the input dynamic range. U.S. Pat. No. 4,547,774 discloses an optical communication system for drill hole logging having an armored cable containing optical fibers. A neodymium laser in a cable reel radiates light onto one of the fibers, a modulator downhole returns it to the surface, and a detector in the reel demodulates the data signal from the returning light. U.S. Pat. No. 4,644,587 discloses an optical data communication system with an optical star repeater which converts an optical signal into an electrical signal, amplifies the electric signal, reconverts the amplified electric signal into an optical signal, and then distributes the signal through fiber optic cables. U.S. Pat. No. 4,875,215 discloses a modular, optical fiber based laser communication system consisting of a sectionally doped optical fiber. U.S. Pat. No. 4,911,519 discloses a packaging technique for optical transmitters/receivers which significantly decreases the parasitic capacitance associated with conventional dual-in-line connections. U.S. Pat. No. 4,916,689 is directed to providing a fiber optic multiplexing controller for interfacing between one or more signal sending units, such as a control computer, and a number of devices to be controlled, such as relays or remote control circuit breakers. Each transmit section includes an optical transmission means for converting an electrical signal to an optical signal and for transmitting the optical signal through a fiber optic cable.

In certain circumstances, an operating environment is so harsh that it is very difficult to obtain accurate and reliable data from a physical event by conventional methods. For example, the detonation of a nuclear device generates such tremendous electromagnetic force that conventional electrical or optical devices are destroyed or severely damaged by the electromagnetic force before any useful data can be obtained.

Thus, it would be desirable to provide a device that could accurately and reliably obtain analog data from a physical event even under harsh operating conditions. The present invention does so with a signal conditioning device that provides a method for transmitting self-calibrated analog signals over optical fibers, thus eliminating the electromagnetically-induced noise normally associated with hard wire coupled data transmission systems.

SUMMARY OF THE INVENTION

A self-contained electrical-to-optical converter/transmitter device is disclosed. The device is particularly useful in a system for the measurement of a physical event requiring extremely fast response to the event. Advantageously, the device includes means for generating a known reference signal and combining the reference signal with electrical signal data from measurement of the physical event in order to calibrate the data. Further, the provision of battery power to the converter/transmitter enables operation of the device without the need to couple power to the device via electrical wires.

In the preferred embodiment, a remote processor generates a calibrate command and a switching signal. The converter/transmitter device includes first and second receiver means for optically receiving the calibrate command and the switching signal, respectively. A transducer is used to generate an analog electrical signal in response to a physical event. Third receiver means are provided for receiving the electrical signal from the transducer. The third receiver means is preferably hardwired to the transducer. Calibration means are provided for generating reference signals in response to the calibrate command, and for mixing the electrical signal with the reference signals to form a calibrated signal. Converter means are provided for converting the calibrated signal to an optical signal. Transmitter means are provided for transmitting the optical signal to the remote processor for evaluation.

Battery means are provided for supplying power to the calibration means, the converter means and the transmitter means so that the apparatus is truly self-contained. Advantageously, an optically-activated switch is coupled between a primary battery means and the calibration means, the converter means and the transmitter means, said switch being responsive to the switching signal for supplying power to the calibration means, the converter means and the transmitter means. An auxiliary battery means provides full time power to the switch.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Generally, the present invention is a self-contained, battery-operated device which receives a wide bandwidth analog electrical signal from a transducer, generates a known reference signal, combines the reference signal with the electrical signal to form a calibrated signal, converts the calibrated signal to an optical signal, and transmits the optical signal to a remote location. Advantageously, the provision of a known reference signal together with the electrical signal allows the electrical signal to be properly interpreted to correct for any nonlinearities in the data or any errors in amplitude.

The invention will be described with reference to its preferred application, namely, obtaining data from the detonation of a nuclear device and transmitting the data via optical fibers to a remote location where the data may be collected and analyzed. It should be realized that the device has broad application to the conversion of electrical data obtained from any type of transducer. It is also noted that the preferred embodiment is described as including redundant circuitry. The redundancy is desirable to provide assurance that the device will work under extremely harsh conditions, and further, the redundancy greatly increases the effective battery life of the device.

Figure 1:
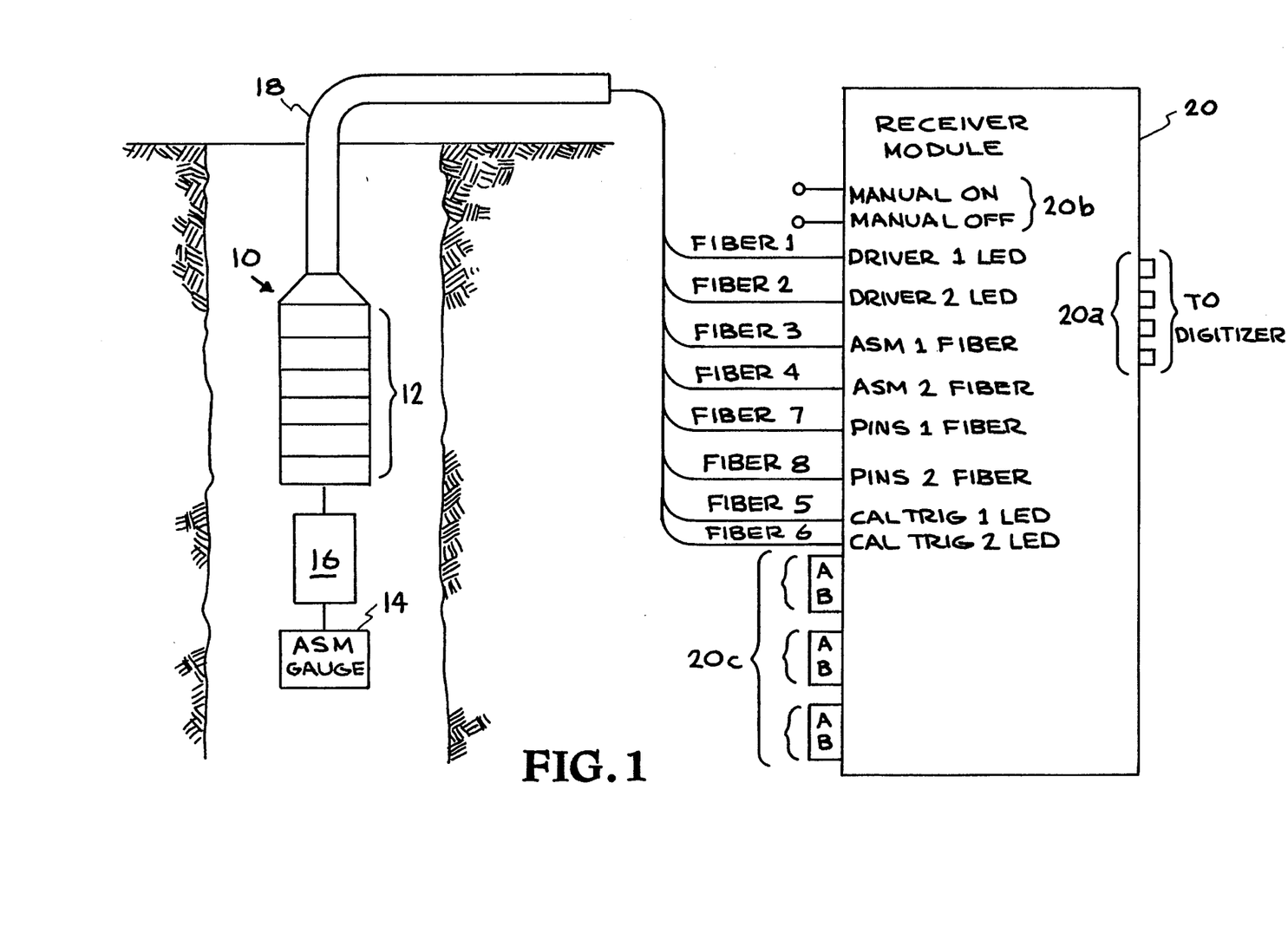
FIG. 1 is a block diagram illustrating the basic components of the present invention.

Referring now to FIG. 1, a cylinder 10 is buried or submerged in a downhole location near a nuclear detonation site. The cylinder 10 is approximately 4.5 inches in diameter and 15 inches long. The cylinder 10 is a rugged sealed unit that is suitable for use in hostile environments. The cylinder 10 houses electronics modules 12 which will be described in more detail later.

An axially symmetric magnetic (ASM) gauge 14 is placed downhole proximate to the cylinder 10 to measure certain shock wave properties of the nuclear event. The ASM gauge 14 is connected to the electronics modules 12 via wire cable 16. The ASM gauge 14 generates analog electrical signals which are processed and converted to analog optical signals by electronics modules 12, as described below. The analog optical signals are transmitted by electronics modules 12 via fiber optic bundle 18 to a receiver module 20 located uphole where the optical signals may be processed and evaluated.

The receiver module 20 is configured to communicate with the electronics modules 12 via optic fibers F1 through F8. The receiver module 20 is compatible with CAMAC (computer automated measurement and control) standards, and thus provides 50 ohm outputs 20a which can be used to transmit output signals to digitizers. The receiver module 20 may be manually controlled via on/off switching circuitry 20b, or preferably, by automatic timing and control circuitry 20c.

Figure 2A:
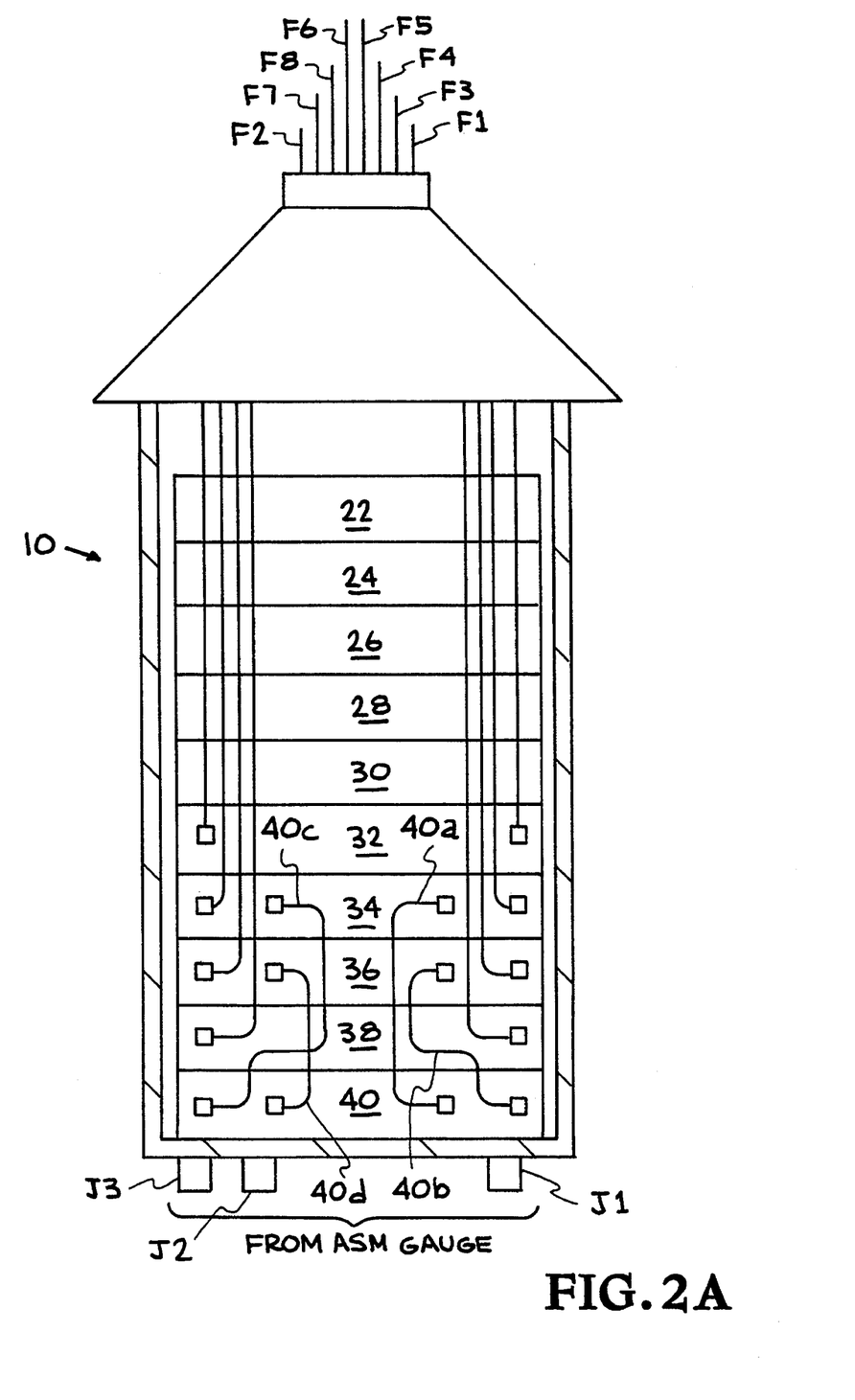
FIG. 2a is an illustration of the transmitter module.

Referring now to FIG. 2a, the electronics module 12 contains 10 D-shaped printed circuit boards, namely first battery module 22, second battery module 24, third battery module 26, fourth battery module 28, auxiliary battery module 30, switch module 32, first fiber optic transmitter module 34, second fiber optic transmitter module 36, first calibration module 38, and second calibration module 40. As will be described in more detail below, the optic fibers F1 and F2 are connected to the switch module 32, optic fibers F3 and F7 are connected to the first fiber optic transmitter module 34, optic fibers F4 and F8 are connected to the second fiber optic transmitter module 36 and optic fibers F5 and F6 are connected to the first calibration module 38.

Figure 2B:
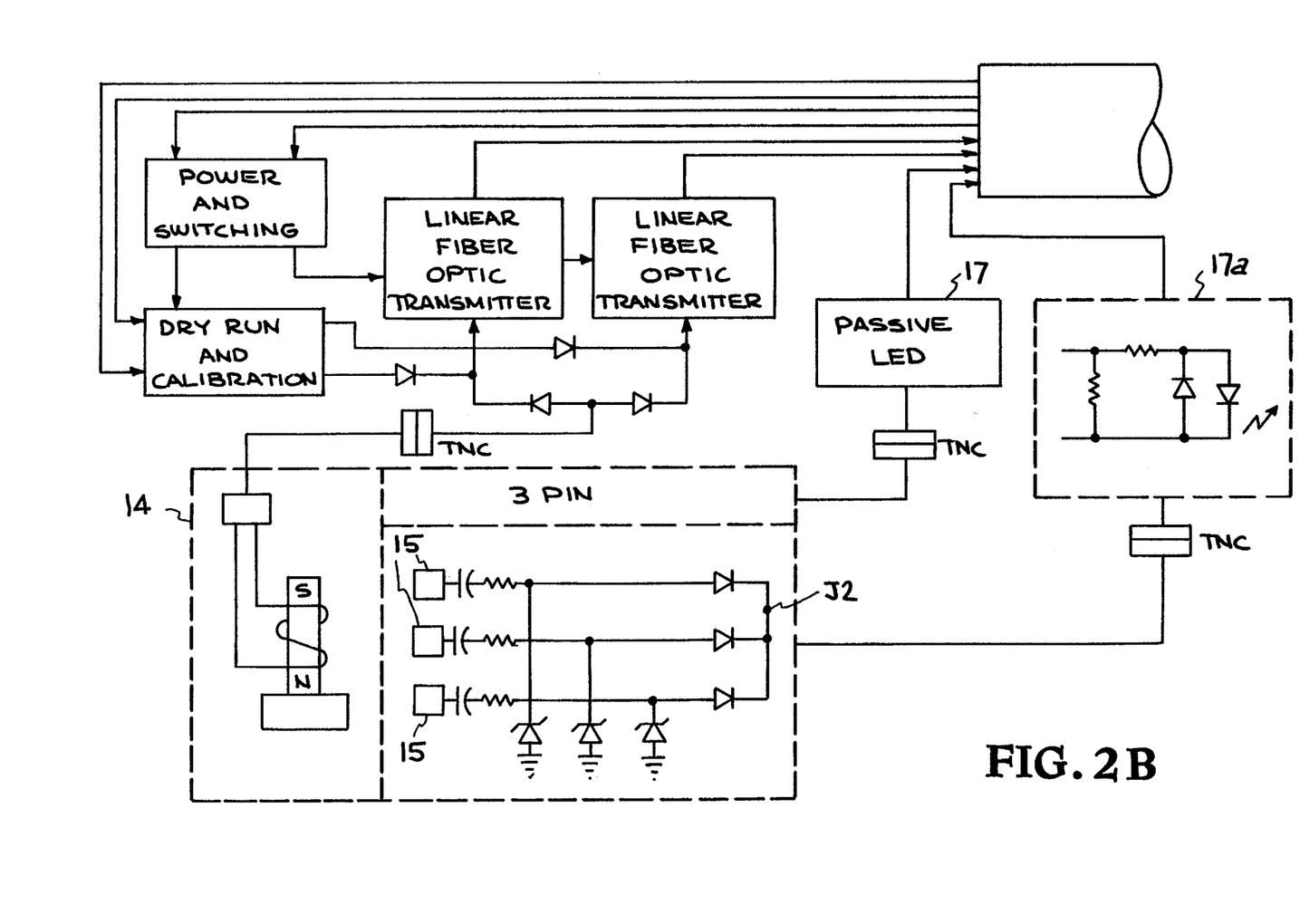
FIG. 2b is a block diagram illustrating the signal components of the present invention.

The ASM gauge 14 provides a three-wire input to the second calibration module 40, as illustrated in FIG. 2b. The first input is provided through SMA jack J1 and is a 0–2 volt analog ASM signal which provides data that describes the detonation event. The second and third inputs are provided through SMA jacks J2 and J3 and are 2–10 volt analog signals (20–100 milliamp) that are generated by piezoelectric crystals through a tri-level Pin diode network, hence inputs J2 and J3 will also be referred to as "PIN" signals. The PIN signals actually represent the time of arrival of the shock waves at known locations downhole, but are only used to provide sufficient power to drive passive LED's, as will be described in more detail below.

The ASM input signal is provided to the first fiber optic transmitter module 34 via jumper wire 40a and to the second fiber optic transmitter module 36 via jumper wire 40b. The first PIN signal is provided to the first fiber optic transmitter module 34 via jumper wire 40c, and the second PIN signal is provided to the second fiber optic transmitter module 36 via jumper wire 40d.

Figure 3:
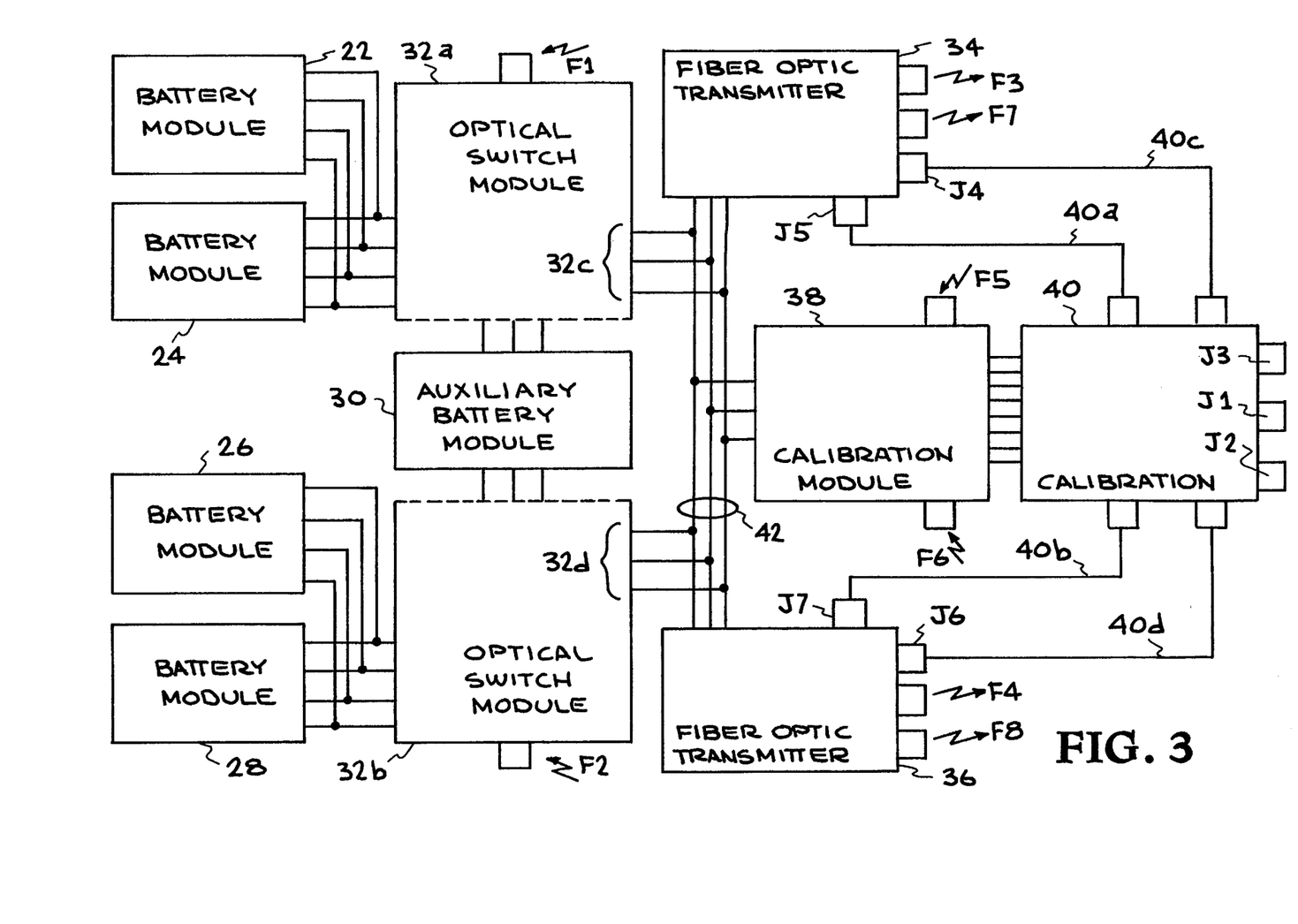
FIG. 3 is a block wiring schematic showing interconnections of the various printed circuit board modules in the transmitter module.

Referring now to FIG. 3, a block wiring diagram illustrates how the ten circuit boards 22–40 of the electronics module 12 are interconnected. The first battery module 22 and second battery module 24 provide parallel redundant power to a first portion 32a of the optical switch module 32 in the form of a positive polarity signal B+ and a negative polarity signal B–. In similar fashion, the third battery module 26 and fourth battery module 28 provide parallel redundant power sources B+ and B– for a second portion 32b of the optical switch module 32b. The auxiliary battery module 30 is wired to provide a positive voltage A+, a common node C, and a negative voltage A– to each of the redundant portions 32a and 32b of the optical switch module 32. The auxiliary battery module 30 is always active in order to keep the optical switch module active. The first portion 32a of optical switch module 32 and the second portion 32b of optical switch module 32 provide redundant switching functions to the remaining modules.

The output 32c of the first portion 32a of optical switch module 32 provides positive battery voltage +, negative battery voltage –, and a common line C, to the first fiber optic transmitter module 34, the second fiber optic transmitter module 36, and the first calibration module 38. The output 32d of the second portion 32b of the optical switch module 32 is parallel and redundant to output 32c. Input to the optical switch module 32 is provided redundantly through optic fibers F1 and F2.

The first calibration board 38 receives a calibrate command redundantly through optic fibers F5 and F6, which initiates the generation of reference signals, as will be described later. The second calibration board 40 is driven by the first calibration board 38. The second calibration board 40 combines the reference signals with the ASM input signal to generate redundant ASM output signals 40a and 40b. Also, a second reference signal is placed on the PIN lines.

The first fiber optic transmitter module 34 converts the ASM output signal and the first PIN signal from electrical to optical signals, then transmits these signals to receiver module 20 via optic fibers F3 and F7, respectively. The second fiber optic transmitter module 36 converts a redundant ASM output signal and the second PIN output signal to optical signals, and transmits them to the receiver module 20 via optic fibers F4 and F8, respectively.

Figure 4A:
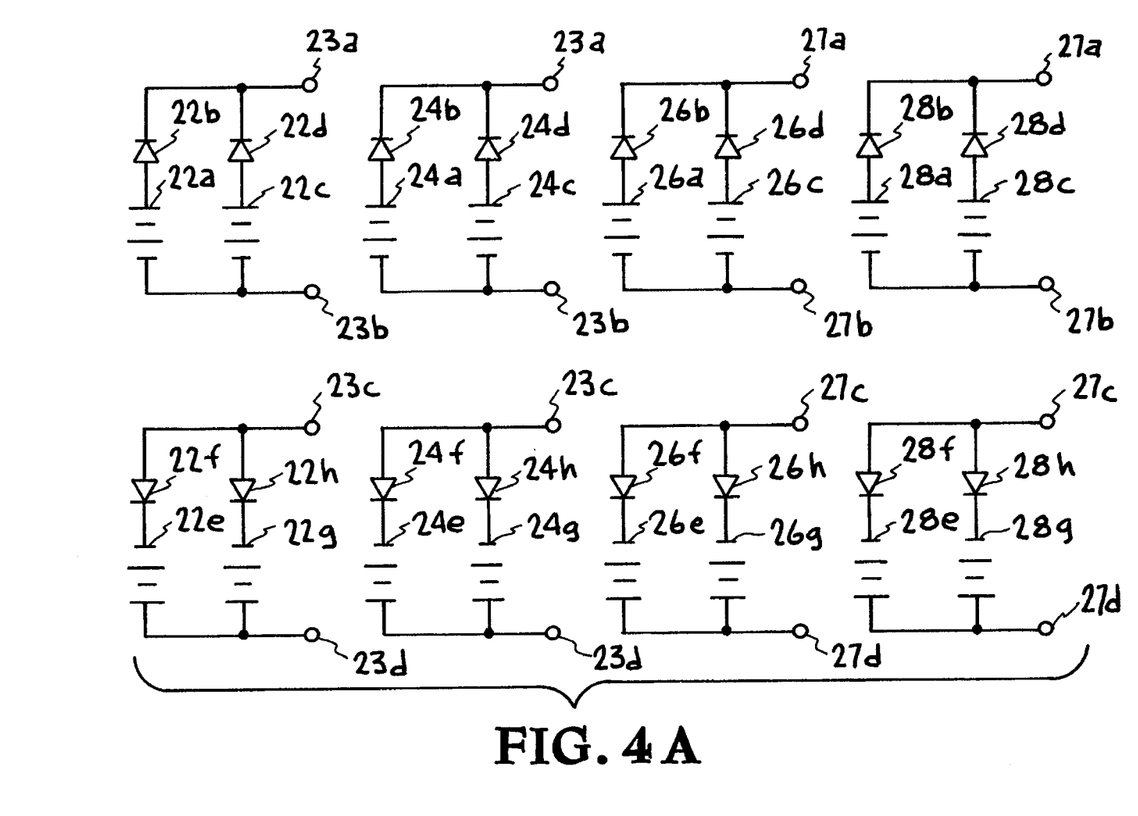
FIGS. 4a and 4b are circuit schematics of the primary and auxiliary battery modules.

Referring now to FIG. 4a, the circuit diagram for the first battery module 22 is illustrated. A conventional 9 volt battery 22a, such as Eveready #522, is placed in series with a low power diode 22b, such as Motorola MBR 1100, and this combination is connected in parallel with a similar combination having 9 volt battery 22c connected in series with low power diode 22d to generate a B+ power signal having a hot node 23a and a common node 23b. In similar fashion, 9 volt battery 22e is placed in series with a low power diode 22f, and this combination is placed in parallel with a 9 volt battery 22g connected in series with low power diode 22h to generate a B− power signal having a hot node 23c and a common node 22d. The circuit diagrams for the second battery module 24, the third battery module 26, and the fourth battery module 28 are all identical to that of the first battery module 22 and need not be described herein.

Figure 4B:
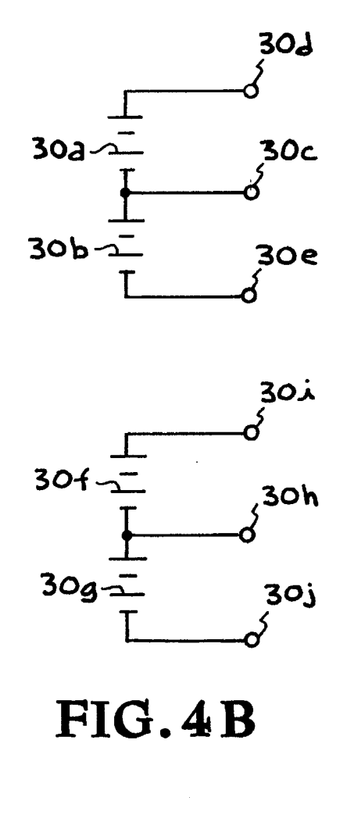

Referring to FIG. 4b, the auxiliary battery module 30 comprises a pair of 9 volt batteries 30a and 30b connected in series providing a common signal C at node 30c between the batteries and providing a positive signal level A+ at node 30d and providing a negative signal level A− at node 30e. Likewise, batteries 30f and 30g are connected in series providing a common signal C at node 30h and providing the positive signal A+ at node 30i and 30j providing the negative signal A− at node 30j.

Figure 5:
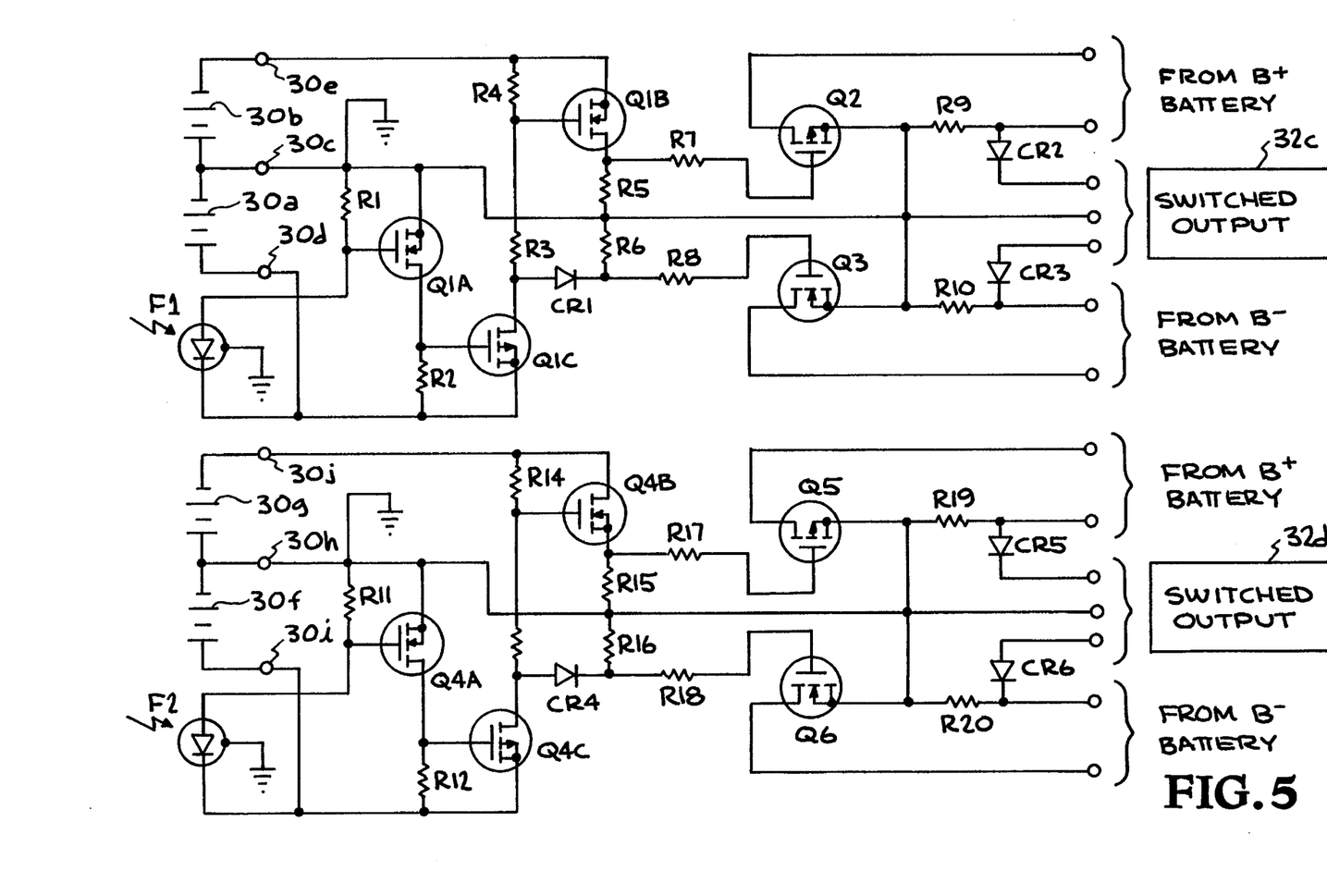
FIG. 5 is a circuit schematic of the optical switch.

Referring now to FIG. 5, the optically-activated switch module 32 is illustrated. The top half of the figure corresponds to the first portion 32a of the switch 32, and the bottom portion of the figure corresponds to the second portion 32b of switch 32. The operation of the circuit will be described with reference to the top half, i.e. first portion 32a, of the drawing. The operation of the bottom half is redundant and need not be described herein.

The B+ and B− power signals from battery modules 22–30 are connected as shown. The auxiliary battery module 30 provides a constant power source to maintain the switch in an active mode. A switching signal sent by receiver module 20 over optic fiber F1 is received at photodiode P1. This pulls down resistor R1, turning on FET Q1A, which in turn pulls up resistor R2 and turns on FET Q1C, which in turn pulls down resistors R3 and R4, thus driving FET Q3 and delivering negative battery voltage—to output 32c. Pulling down resistor R4 also turns on FET Q1B, thus driving FET Q2 to deliver positive battery voltage + to the output 32c. Resistors R7 and R8 serve to isolate the battery portion from the switched portion of the circuit. The resistors R5 and R6 discharge FET's Q2 and Q3 after a switching event. The operation of the second portion 32b is analogous.

Figure 6:
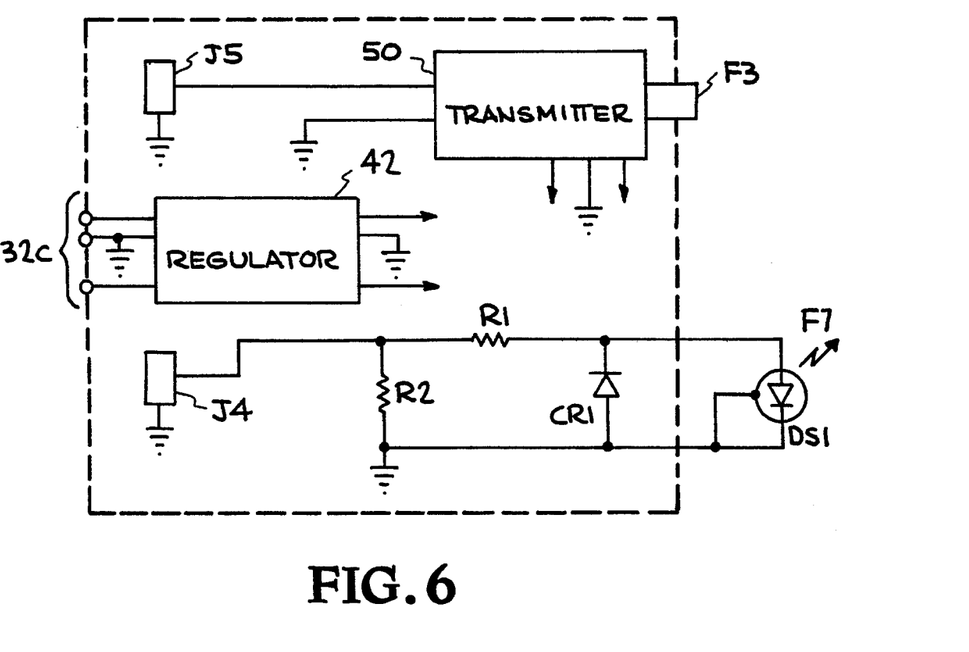
FIG. 6 is a block diagram of the fiber optic transmitter board.
Figure 7:
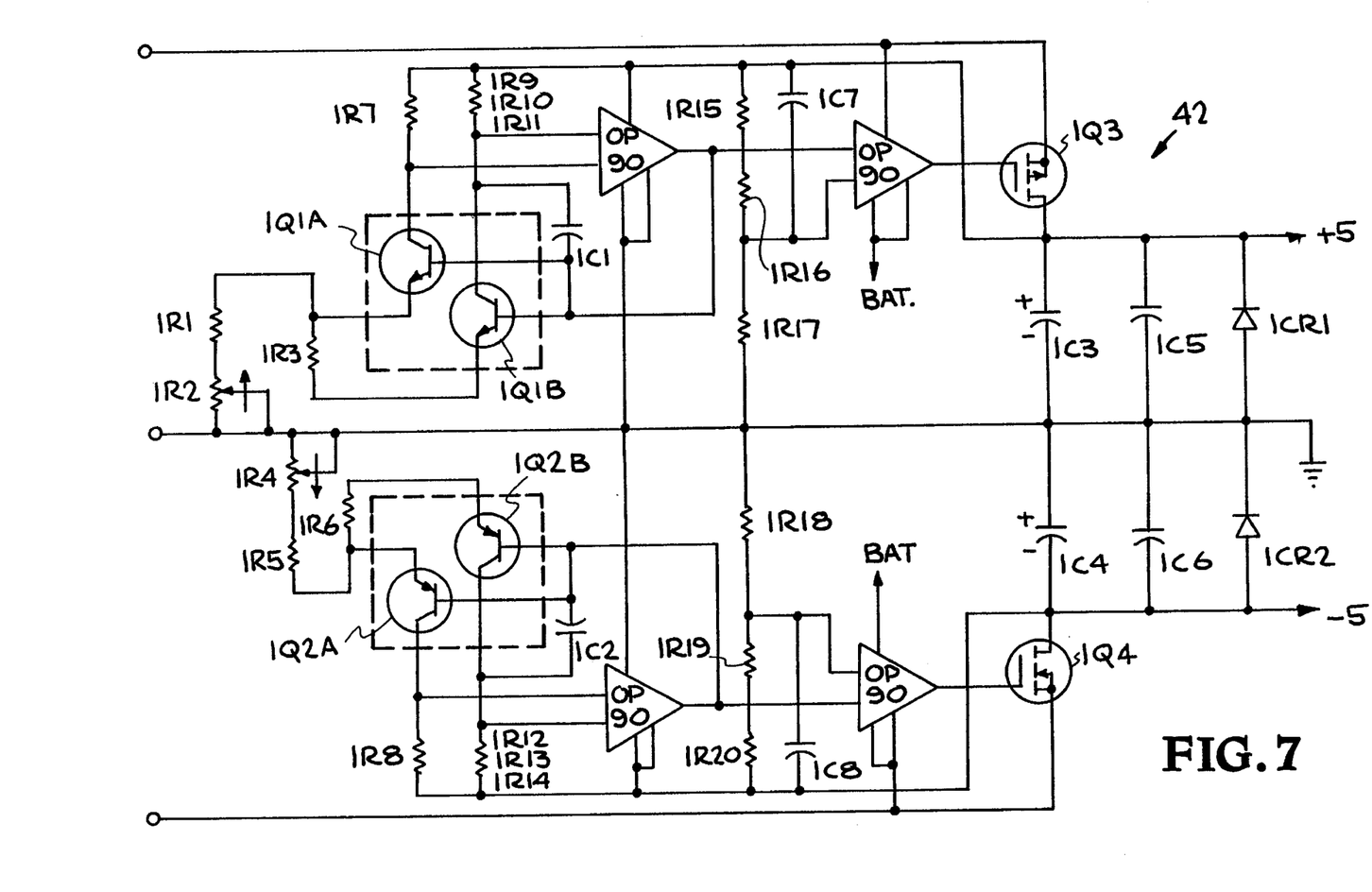
FIG. 7 is a circuit schematic of the voltage regulator.

Referring now to FIG. 6, a functional block diagram of the first fiber optic transmitter module 34 is illustrated. The structure and operation of the second fiber optic transmitter module 36 is identical. The battery voltage output 32C from optical switch module 32 is regulated to a precise voltage level by a conventional regulator circuit 42, which is illustrated in FIG. 7, for use in the active components. The first PIN signal is received at SMA connector J4 and passively converted to an optical signal which is emitted by a conventional light emitting diode DS1 onto optic fiber F7. The ASM output signal, which includes the raw ASM signal as well as the reference signal, is received at SMA connector J5 in the transmitter circuit 50, which converts the ASM output signal to an optical signal, as is described in further detail below, and transmits the optical signal onto optic fiber F3.

Figure 8A:
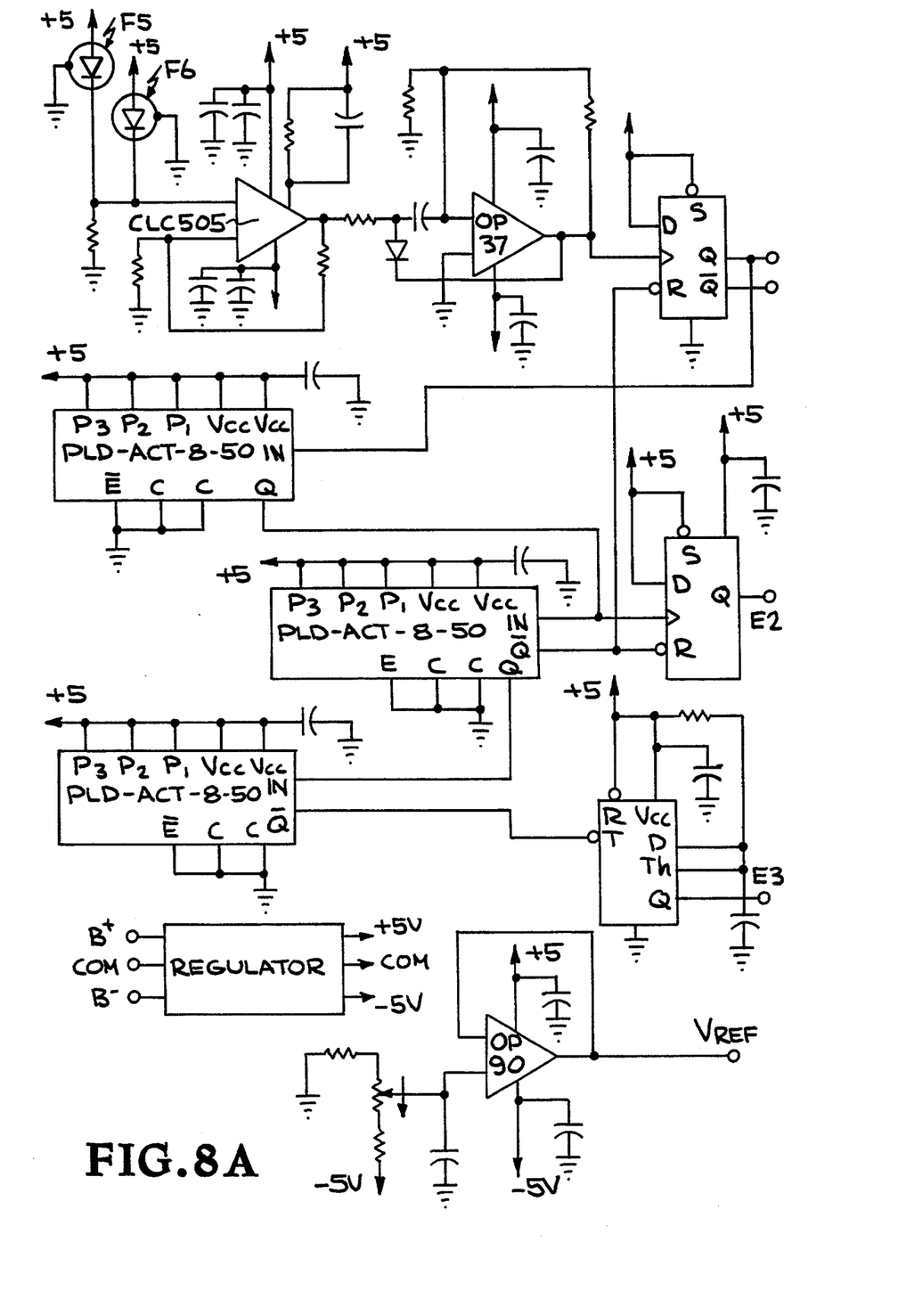
FIGS. 8a and 8b are circuit schematics of the fiber optic transmitter module.
Figure 8B:
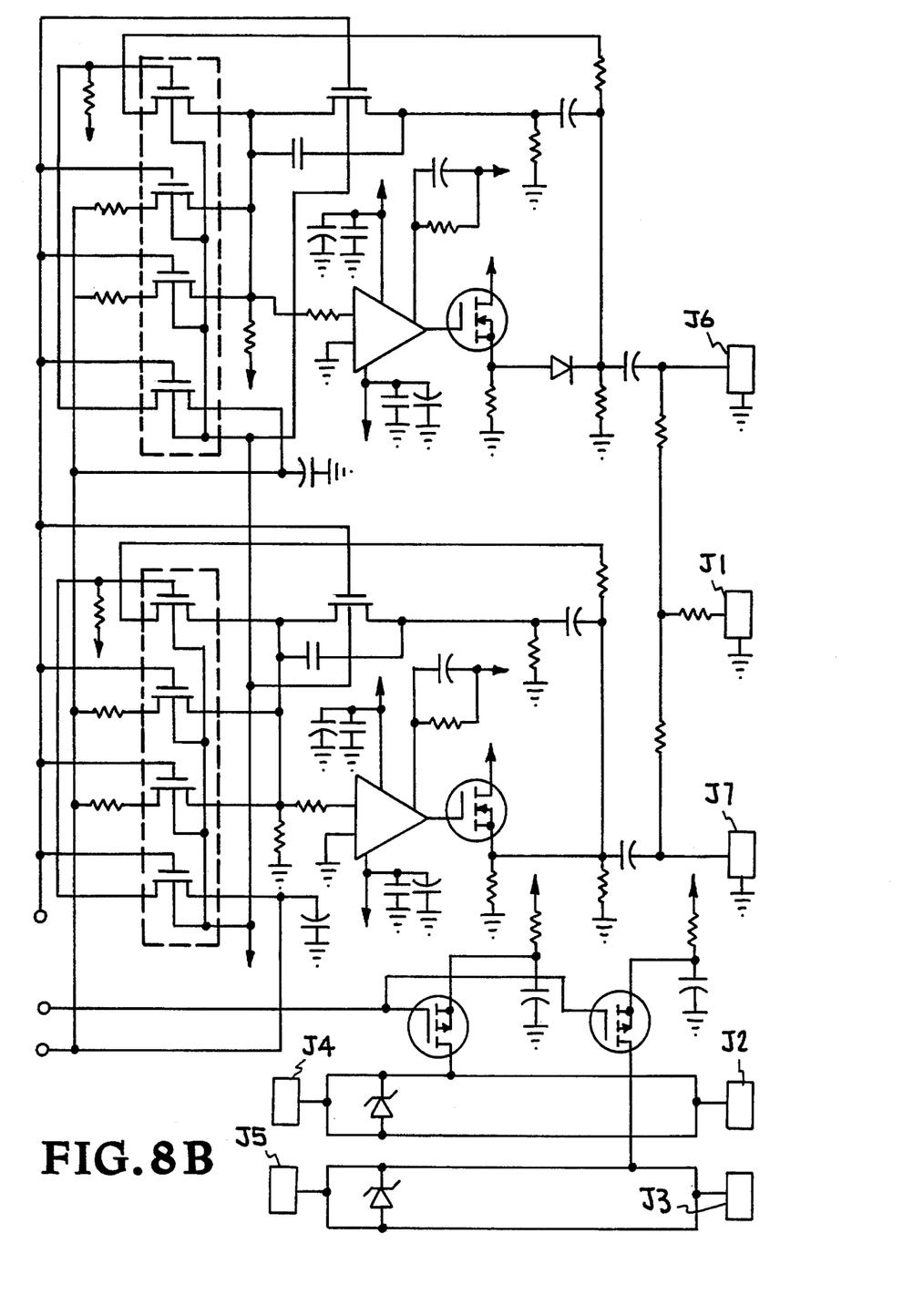

The first and second calibration boards 38 and 40 are illustrated in FIG. 8. A detailed description of the circuity is not provided as the same would be obvious to one with ordinary skill in the art. However, the operation will be described briefly.

Figure 10:
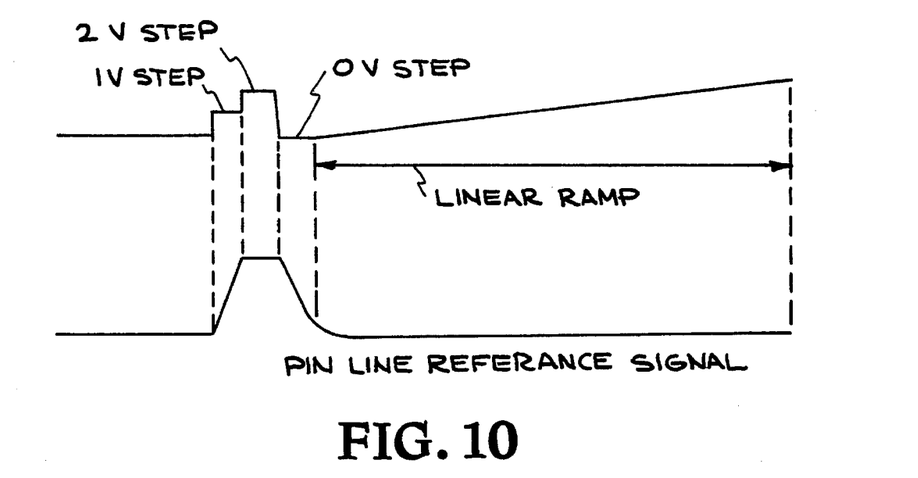
FIG. 10 is a plot of output signals from the present invention.

The receiver module 20 generates a CALIBRATE command when it is desired to assert the reference signals. The CALIBRATE command is transmitted redundantly to the first calibration board 38 via optic fibers F5 and F6, where it is received by photodiodes CR1 and CR2 and then amplified to initiate the generation of the reference signals. Preferably, the reference signals are displaced in time from the ASM signal. The CALIBRATE command drives FET's 48, 49 in order to place the first reference signal, a 700 nanosecond reference pulse of 4 volts, on the PIN lines. The CALIBRATE command also initiates the sequencers U2, U3, U4, which in turn drive the FET's 44, 45 in order to generate the second reference signal. The second reference signal is a reference waveform having a three 400 nanosecond steps, namely a 1 volt step, a 2 volt step, a 0 volt step, and a 4 millisecond linear ramp from 0 volts to 2 volts. The reference signals are illustrated in FIG. 10.

Figure 9:
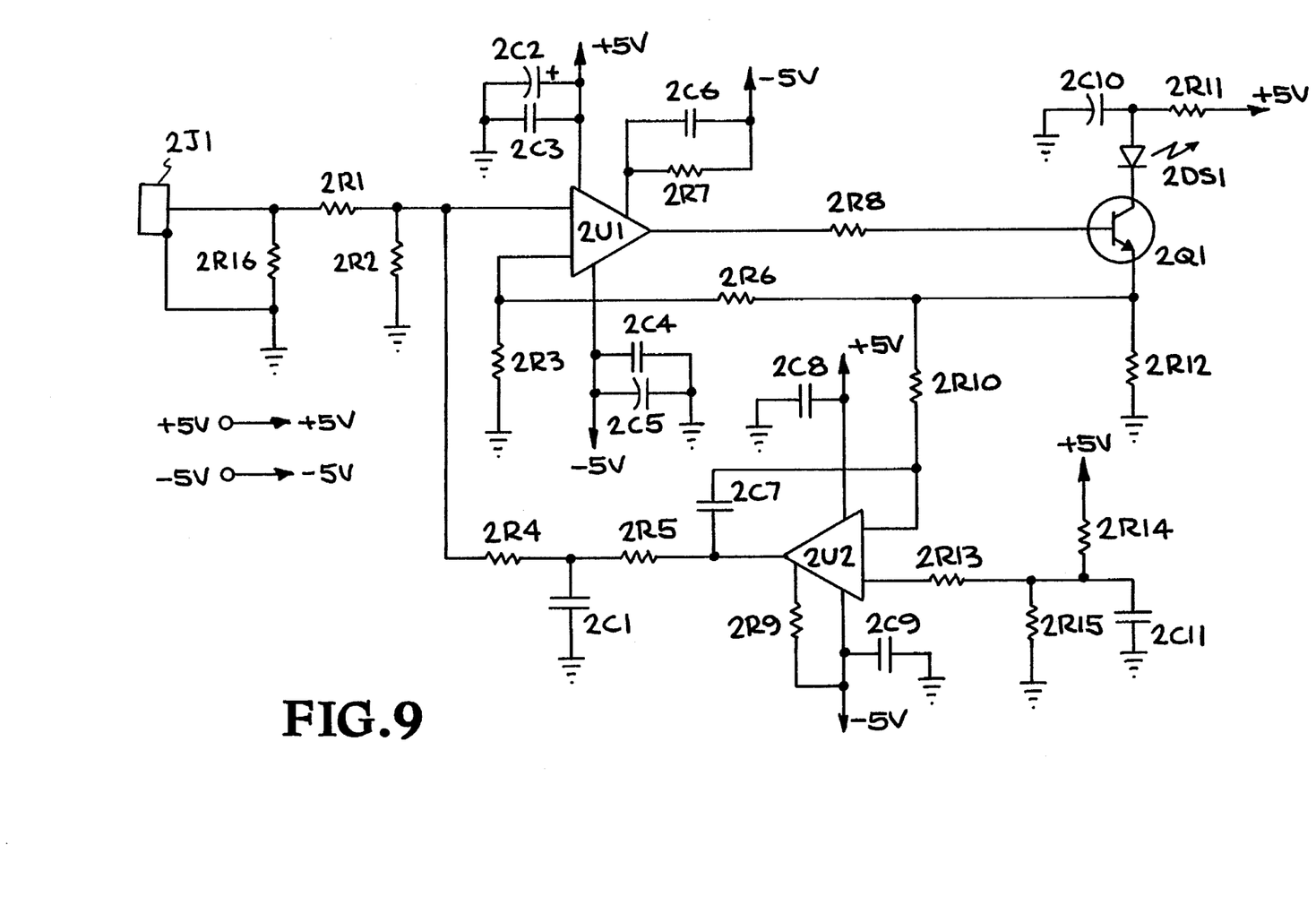
FIG. 9 is a circuit schematic of the calibration board.

The ASM input signal is received at jack J1 and split into two paths by the resistive matched-T network, where the reference waveform is combined with the ASM input signal to form the ASM output signals on jacks J6 and J7. Note that the ASM signal output ratio can be adjusted by varying the value of the matched-T resistors to get more coverage. The ASM output signals are then sent to the fiber optic transmitter modules 34 and 36, respectively. Each of the fiber optic transmitter modules 34 and 36 has a conventional phototransmitter circuit 50, as illustrated in FIG. 9, for converting the ASM output signal to an optical signal and transmitting the optical signal via a light emitting diode to the receiver module 20.

The reference signal thus provides a known waveform which can be used as an amplitude reference at three points when the ASM data is combined therewith, thereby providing both a verification of the operation of the fiber optics and a correction for any non-linearities in the fiber optics.

It should be understood that the invention is not intended to be limited by the specifics of the above-described embodiment, but rather defined by the accompanying claims.

We claim:

1. A self-contained electrical-to-optical converter/transmitter, comprising:

a housing;

a plurality of circuit elements contained within the housing and adapted to be electrically coupled to a transducer and optically coupled to a receiver/processor, said circuit elements comprising:

first circuit means for receiving an analog electrical signal from the transducer;

second circuit means for converting the analog electrical signal to a calibrated analog optical signal, comprising fourth circuit means for generating a reference signal; fifth circuit means for adding the reference signal with the analog electrical signal such that the reference signal is displaced in time from the analog electrical signal thereby forming a calibrated signal; and sixth circuit means for converting the calibrated signal to said calibrated analog optical signal;

third circuit means for transmitting the calibrated analog optical signal to the remote receiver/processor;

a first battery source for supplying power to the first, second and third circuit means;

a switching circuit coupled in series with the first battery source, said switching circuit having a normally open state wherein the first, second and third circuit means are not powered, said switching circuit including seventh means for receiving an optical switching signal from the remote receiver/processor wherein the switching circuit closes upon receiving the optical switching signal thereby supplying power to the first, second and third circuit means; and a second battery source for supplying power to the switching circuit.

2. A converter/transmitter as in claim 1, wherein the fourth means comprises means for receiving a third optical signal from the remote receiver/processor and for generating the reference signal in response thereto.

3. A converter/transmitter as in claim 1, wherein the means for generating a reference signal comprises means for generating a precise waveform having a plurality of discrete pulse steps followed by a linear ramp.

4. A converter/transmitter as in claim 3, wherein the plurality of discrete pulse steps have equal pulse widths but different amplitudes.

5. A signal conditioning circuit utilizable in a system for transmitting analog data obtained from a transducer to a processor, comprising:

a housing;

a plurality of circuit elements contained within the housing and adapted to be electrically coupled to a transducer and optically coupled to a receiver/processor, said plurality of circuit elements comprising:

first means for receiving an analog electrical signal from the transducer;

second means for generating a linear reference signal;

third means for mixing the analog electrical signal with the linear reference signal to form a calibrated output signal, wherein said calibrated output signal comprises the analog electrical signal and the linear reference signal being displaced in time from each other;

fourth means for converting the calibrated output signal to an optical signal and for transmitting the optical signal to a processor; and batteries for providing power to the signal conditioning circuit.

* * * * *